US 9,811,402 B2

(12) United States Patent
Hu et al.

(10) Patent No.: US 9,811,402 B2
(45) Date of Patent: *Nov. 7, 2017

(54) GENERATION OF REPRESENTATIONAL STATE TRANSFER INTERFACE FROM APPLICATION PROGRAMMING INTERFACES

(71) Applicant: International Business Machines Corporation, Armonk, NY (US)

(72) Inventors: Zhenwei Hu, Pleasanton, CA (US); Hoang-Nam Nguyen, Fremont, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,391

(22) Filed: Feb. 17, 2016

(65) Prior Publication Data

US 2016/0162344 A1 Jun. 9, 2016

Related U.S. Application Data

(63) Continuation of application No. 14/248,683, filed on Apr. 9, 2014, now Pat. No. 9,294,543.

(51) Int. Cl.
*G06F 3/00* (2006.01)
*G06F 9/44* (2006.01)
(Continued)

(52) U.S. Cl.
CPC ............. *G06F 9/546* (2013.01); *G06F 8/30* (2013.01); *G06F 8/40* (2013.01); *G06F 9/54* (2013.01); *G06F 9/541* (2013.01); *H04L 67/02* (2013.01)

(58) Field of Classification Search
None
See application file for complete search history.

(56) References Cited

U.S. PATENT DOCUMENTS 5,848,273 A * 12/1998 Fontana ................. G06F 9/465
707/999.1
6,694,381 B1 2/2004 Lo et al.
(Continued)

FOREIGN PATENT DOCUMENTS

CN 102368217 A 3/2012

OTHER PUBLICATIONS

S. Albrand, et al., "Organization, Management, and Documentation of ATLAS Offline Software Releases," 2010, Journal of Physics: Conference Series 219, IO Publishing, pp. 1-10, retrieved from http://iopscience.iop.org/article/10.1088/1742-6596/219/4/042012/pdf on Jan. 18, 2017.*

(Continued)

*Primary Examiner* — Chat Do
*Assistant Examiner* — William C Wood
(74) *Attorney, Agent, or Firm* — Zilka-Kotab, P.C.

(57) ABSTRACT

In one embodiment, a method includes extracting, by one or more processors, a class name from a uniform resource identifier (URI) of an application header of a standardized interface request that includes a command formatted in an application protocol. The application header includes metadata that allows class declarations to function, at least in part, as a portion of interface description language. In another embodiment, a computer system for generating a RESTful interface includes a computer-readable memory and one or more processors in electrical communication with the memory. The one or more processors are configured to perform the method recited above. In yet another embodiment, a computer program product includes a computer-readable storage medium and program instructions stored on (Continued)

the computer-readable storage medium readable/executable by one or more processors to perform the method recited above.

20 Claims, 8 Drawing Sheets

(51) Int. Cl.
*G06F 9/46* (2006.01)
*G06F 13/00* (2006.01)
*G06F 9/54* (2006.01)
*H04L 29/08* (2006.01)
*G06F 9/45* (2006.01)

(56) References Cited

U.S. PATENT DOCUMENTS

| | | | |
|---|---|---|---|
| 7,454,759 B2 | 11/2008 | Mukundan et al. | |
| 9,294,543 B2 | 3/2016 | Hu et al. | |
| 2004/0267808 A1* | 12/2004 | Matsushima | H04L 67/02 |
| 2010/0268720 A1* | 10/2010 | Spivack | G06F 17/3087 |
| | | | 707/756 |
| 2011/0113341 A1 | 5/2011 | Liensberger et al. | |
| 2011/0295932 A1 | 12/2011 | Morris | |
| 2015/0295983 A1 | 10/2015 | Hu et al. | |

OTHER PUBLICATIONS

Zhenwei et al., U.S. Appl. No. 14/248,683, filed Apr. 9, 2014.
Non-Final Office Action from U.S. Appl. No. 14/248,683, dated May 27, 2015.
Notice of Allowance from U.S. Appl. No. 14/248,683, dated Dec. 16, 2015.
List of IBM Patents or Patent Applications Treated as Related.

* cited by examiner

GENERATION OF REPRESENTATIONAL STATE TRANSFER INTERFACE FROM APPLICATION PROGRAMMING INTERFACES

BACKGROUND

The present invention relates generally to the field of program interfaces, and more particularly to automatic generation of program interfaces.

Representational state transfer (REST) is a program interface specification consisting of a coordinated set of architectural constraints applied to components, connectors, and data elements, within a distributed hypermedia system. REST ignores the details of component implementation and protocol syntax in order to focus on the roles of components, the constraints upon their interaction with other components, and their interpretation of significant data elements.

Web Service application programming interfaces (APIs) that adhere to the REST constraints are called RESTful. RESTful APIs are defined using aspects such as a uniform resource identifier (URI), an Internet media type for the data (This is often JavaScript Object Notation (JSON) but can be any other valid Internet media type), standard HTTP commands, also called methods, (e.g., GET, PUT, POST, or DELETE), hypertext links to reference state, and hypertext links to reference related resources.

SUMMARY

In one embodiment, a method includes extracting, by one or more processors, a class name from a uniform resource identifier (URI) of an application header of a standardized interface request that includes a command formatted in an application protocol. The application header includes meta-data that allows class declarations to function, at least in part, as a portion of interface description language.

In another embodiment, a computer system includes a computer-readable memory and one or more processors in electrical communication with the memory. The one or more processors are configured to perform a method. The method includes extracting, by one or more processors, a class name from a URI of an application header of a standardized interface request that includes a command formatted in an application protocol. The application header includes meta-data that allows class declarations to function, at least in part, as a portion of interface description language.

In yet another embodiment, a computer program product includes a computer-readable storage medium and program instructions stored on the computer-readable storage medium readable/executable by one or more processors to perform a method. The method includes extracting, by one or more processors, a class name from a URI of an application header of a standardized interface request that includes a command formatted in an application protocol. The application header includes meta-data that allows class declarations to function, at least in part, as a portion of interface description language.

DETAILED DESCRIPTION

Figure 1:
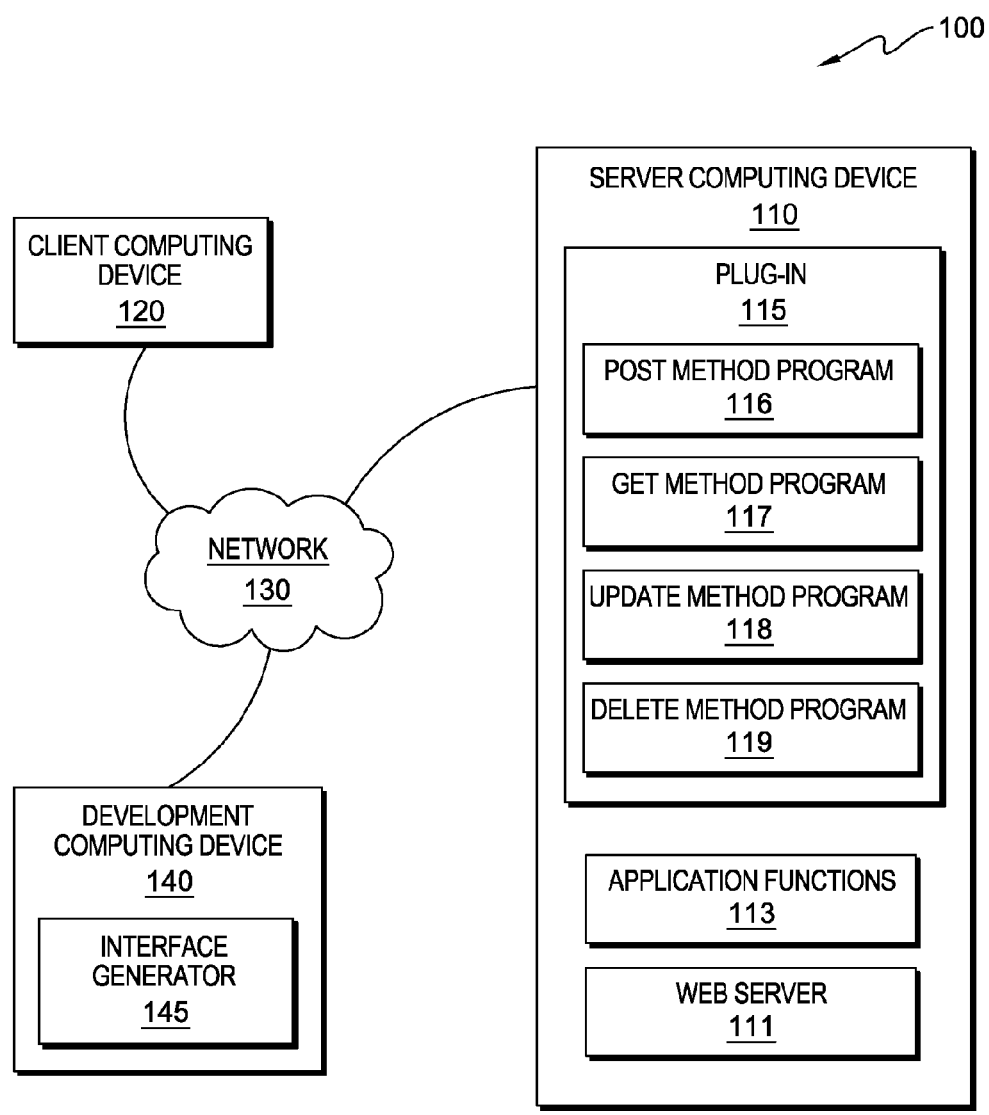
FIG. 1 is a functional block diagram illustrating an application deployment environment, in accordance with an exemplary embodiment of the present invention.

A concept in REST is the existence of resources (sources of specific information), each of which is referenced with a global identifier (e.g., a uniform resource identifier (URI) in Hypertext Transfer Protocol (HTTP)). In order to manipulate these resources, components of the network (e.g., user agents, origin servers etc.) communicate via a standardized interface (e.g., HTTP) and exchange representations of these resources (which are often documents conveying the representation). For example, a resource that represents a circle (as a logical object) may both accept and return a representation that specifies a center point and radius, formatted in Scalable Vector Graphics (SVG), but may also both accept and return a representation that specifies any three distinct points along the curve (since this also uniquely identifies a circle) as a comma-separated list.

Any number of connectors (e.g., clients, servers, caches, tunnels, etc.) can mediate the request, but each does so without "seeing past" its own request (referred to as "layering", another constraint of REST and a common principle in many other parts of information and networking architecture). Thus, an application can interact with a resource by knowing two things: the identifier of the resource and the action required. The application does not need to know whether there are caches, proxies, gateways, firewalls, tunnels, or anything else between it and the server actually holding the representation. The application does, however, need to understand the format of the returned representation, which is typically a type of Hyper Text Markup Language (HTML), Extensible Markup Language (XML), or Java® Script Object Notation (JSON or, as used in certain examples herein, json), an object oriented language, or document format, although the returned information may be an image, plain text, or any other format.

In known solutions, in order to provide a RESTful interface for an application, a developer writes code to process HTTP requests received by a HTTP application server. Such code includes instructions to execute the following steps: (1) translate the embedded REST request and data in a data-interchange format (e.g., data in a language-independent data format such as JavaScript Object Notation (JSON) or Extensible Markup Language (XML)) representation into programmatic format (e.g., a C++ data type) as input parameters of a function; (2) dispatch the request to the API of the appropriate application with the input parameters of the function; (3) translate any output data into a data-interchange format, such as JSON; (4) assemble the response, such as an HTTP response; and (5) send the response to the client.

In order to use a RESTful interface in a programmatic manner as a client, e.g., in a script, a user needs to perform the following steps: (1) translate any input data into a data-interchange format, such as JSON; (2) assemble a request, such as an HTTP request, with the input data; (3) send the request to application server; (4) receive a response from application server; and (5) translate the embedded response data, often in JSON, into script objects or variables for further processing.

Given the description of an application programming interface (API) in C++ classes, which can be seen as describing REST resources, the above-described steps used by the application's developer and user can be both cumbersome and error-prone, due to the amount of required programming and user input.

Embodiments of the present invention recognize that enhancing an application programming interface with meta-data that is required to automatically generate the code described above reduces the amount of programming required to create a RESTful interface. Embodiments of the present invention also recognize that such enhancement reduces the number of errors included in the programming of such an interface. Embodiments of the present invention recognize that a header file, which contains class declarations and is enhanced with meta-data, functions, at least in part, as a portion of interface description language (or alternatively, an interface definition language) (IDL) that is fed into a code generator tool.

The present invention will now be described in detail with reference to the Figures. FIG. 1 is a functional block diagram illustrating an application deployment environment, generally designated 100, in accordance with one embodiment of the present invention. Application deployment environment 100 includes server computing device 110, client computing device 120, and development computing device 140, connected over network 130. Server computing device 110 includes plug-in 115, post method program 116, get method program 117, update method program 118, delete method program 119, application functions 113, and web server 111. Development computing device 140 includes interface generator 145.

In various embodiments of the present invention, server computing device 110, client computing device 120, and development computing device 140 are computing devices that can respectively be a standalone device, a server, a laptop computer, a tablet computer, a netbook computer, a personal computer (PC), or a desktop computer. In another embodiment, each of server computing device 110, client computing device 120, and development computing device 140 respectively represents a computing system utilizing clustered computers and components to act as a single pool of seamless resources. In general, server computing device 110, client computing device 120, and development computing device 140 can each be any computing device or a combination of devices with access to interface generator 145, plug-in 115, post method program 116, get method program 117, update method program 118, delete method program 119, application functions 113 and web server 111, and capable of executing interface generator 145, plug-in 115, post method program 116, get method program 117, update method program 118, delete method program 119, application functions 113 and web server 111. Server computing device 110, client computing device 120, and development computing device 140 may each include internal and external hardware components, as depicted and described in further detail with respect to FIG. 7.

In this exemplary embodiment, plug-in 115, post method program 116, get method program 117, update method program 118, delete method program 119, application functions 113 and web server 111 are stored on server computing device 110, and interface generator 145 is stored on development computing device 140. However, in other embodiments, interface generator 145, plug-in 115, post method program 116, get method program 117, update method program 118, delete method program 119, application functions 113 and web server 111 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that supports communications between server computing device 110, client computing device 120, development computing device 140, plugin 115, post method program 116, get method program 117, update method program 118, delete method program 119, application functions 113, web server 111 and interface generator 145, in accordance with a desired embodiment of the present invention.

In this exemplary embodiment, application functions 113 include a binary file (i.e., execution code) that is a result of compiling application source code (for example, C++ source code), and specifically includes application headers, e.g., C++ headers. In the following description, C++ source code is often used along with C++ headers. However, it is to be noted that the use of C++ (as opposed to, for example, another programming language) is not to be interpreted as a limitation. In general, application functions 113 include un-compiled program functions to be exposed as services consisting of source code and header files. These program functions include predefined meta-data tags, e.g., Doxygen tags, which interface generator 145 uses to generate RESTful API stub code. Thus, plug-in 115 in its deployed form in FIG. 1 includes the generated RESTful API stub code, post method program 116, get method program 117, update method program 118 and delete method program 119.

In this exemplary embodiment, web server 111 is software (i.e., a computer application, a program) that helps deliver web content through the Internet. The primary function of web server 111 is to deliver web pages to clients, such as client computing device 120. Communication between client computing device 120 and web server 111 is accomplished using, for example, Hypertext Transfer Protocol (HTTP). Web server 111 works in conjunction with plug-in 115 to execute and respond to incoming requests, such as by providing web pages, which frequently include HTML documents, images, style sheets, scripts, and text content. In this embodiment, in the context of RESTful API, the responses are structured in JSON format.

In exemplary embodiments, interface generator 145 is a RESTful API code generator that generates RESTful API stub code using class header files (which, in the following examples, are essentially the definitions of the C++ classes). Meta-data tags, such as predefined doxygen tags, are inserted into the code of functions to be exposed as world wide web (web) services consisting of source and header files. A web service is a method of communications between two electronic devices over the web. It is a program function provided at a network address over the web with the service always on, as in the concept of utility computing.

The meta-data tags are inserted before class properties or class methods of functions to be exposed as web services. These tags allow the class properties or class methods of functions to be exposed as web services to function, at least in part, as portions of an IDL. In the examples included herein, these meta-data tags are doxygen tags that are annotations in C++ inline comments, which, in general, do not affect the functioning of the class properties or class methods. Examples of such tags are shown below in a later portion of this description.

Figure 8:
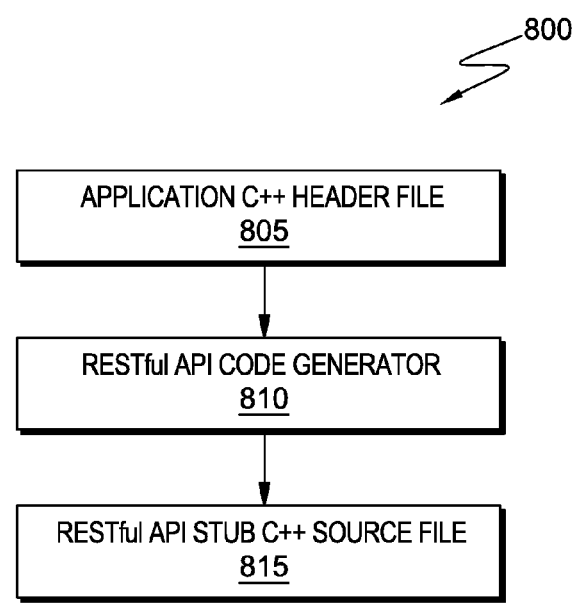
FIG. 8 depicts a flow diagram illustrating a general workflow of an interface generator executing on a development computing device as shown in FIG. 1, in accordance with an exemplary embodiment of the present invention.

Interface generator 145 uses the tagged header files to automatically generate the RESTful interfaces using generated RESTful API stub code, which herein refers to pieces of code used for generating class files based off a web service definition file (WSDL). Many programming languages have Simple Object Access Protocol (SOAP) tools designed to generate stub code from a WSDL file. SOAP is a protocol specification for exchanging structured information in the implementation of web services in computer networks. It relies on XML Information Set for its message format, and usually relies on other application layer protocols, for example HTTP or Simple Mail Transfer Protocol (SMTP), for message negotiation and transmission. A flow diagram illustrating the general workflow of interface generator 145 is shown in FIG. 8.

In this exemplary embodiment, development computing device 140 is a computing device that executes interface generator 145. In general, development computing device 140 is a computer that includes a compiler that compiles generated RESTful API stub code and application source code and links them together in a plug-in, such as plug-in 115, which is then deployed on a web server, such as web server 111.

In this exemplary embodiment, post method program 116, get method program 117, update method program 118, and delete method program 119 are subprograms that are used by interface generator 145 to generate RESTful API stub code and to process requests, such as standardized interface requests (for simplicity, HTTP requests are used herein, however, this is not to be interpreted as a limitation). In other embodiments, plug-in 115 includes other programs that extend to other types of application protocol commands, (e.g., HTTP request methods such as put, head, options, trace, connect and patch), and are sub-programs that can be called by interface generator 145. The functioning of such sub-programs are readily understood by ones skilled in the art in light of the present disclosure. As such, the use of post method program 116, get method program 117, update method program 118 and delete method program 119 herein are not to be interpreted as a limitation as to the specific subprograms that are called by interface generator 145, in various embodiments, to generate RESTful API stub code and to process requests.

The functions of plug-in 115, post method program 116, get method program 117, update method program 118 and delete method program 119 are discussed in further detail in the discussion of FIGS. 2, 3, 4, 5 and 6. To further provide context and functionality to the types of commands (i.e., methods, also called functions) and subprograms that can be processed and/or called by an application interface, a description of HTTP commands (i.e., types of HTTP methods that are used to convey a requested action) are provided below.

A get method is a function that requests a representation of the specified resource. Requests using GET should only retrieve data and should have no other effect. (This is also true of some other HTTP methods.)

A head method is a function that requests a response that is substantially identical to the response that would correspond to a processed get command, but without the response body that is included in the response of the processed get command. This may be useful for retrieving meta-information written in response headers, without having to transport the entire content.

A post method is a function that requests the server to accept the entity enclosed in the request as a new subordinate of the web resource identified by the URI. The data that is posted might be, as examples, an annotation for existing resources; a message for a bulletin board, newsgroup, mailing list, or comment thread; a block of data that is the result of submitting a web form to a data-handling process; or an item to add to a database.

A put (also called update) method is a function that requests that an enclosed entity be stored under the supplied URI. In other words, a put method is a request to update a resource specified by the standardized interface request. If the URI refers to an already existing resource, then that resource is modified to include the enclosed entity. If the URI does not point to an existing resource, then the server can create a resource with that URI and enclosed resource.

A delete method is a function that requests a deletion of a specified resource.

A trace method is a function that requests a copy of a received request. This may allow, for example, a client to see what, if any, changes or additions have been made to the received request, which can be made by, for example, intermediate servers.

An option method is a function that requests a return of HTTP methods that are supported for the specified URL, which can be in the form of a list that a server supports. This can be used to check the functionality of a web server by requesting '*' instead of a specific resource.

A connect method is a function that requests a conversion of a request connection to a transparent Transmission Control Protocol (TCP)/Internet protocol suite (IP) (i.e., a TCP/IP tunnel. This may be used to facilitate cryptographic protocol encrypted communication (e.g., Secure Hypertext Transfer Protocol (S-HTTP)) through an unencrypted HTTP proxy.

A patch method is a function that requests an application of one or more partial modifications to a resource.

In certain embodiments, interface generator 145 includes programming to parse application source code and identify predefined doxygen tags that interface generator 145 can use to generate RESTful API stub code. In such embodiments, interface generator 145 may also include a sub program that program developers can use to add predefined doxygen tags to their source code such that interface generator 145 can generate RESTful API stub code using the modified source code.

In this exemplary embodiment, plug-in 115 includes RESTful API stub C++ source code, RESTful API stub binary code, application C++ source code and compiled application code (i.e., binary code). However, it is to be noted that the use of C++ is not to be interpreted as a limitation. Plug-in 115 is a plug-in that is created when application C++ source code and generated RESTful API stub C++ code are compiled, using a C++ compiler (such as g++) and are linked together as a plug-in for a web server (in the form of binary code).

In general, such a built plug-in is deployed by configuring a web server to call the generated RESTful API if a request comes in, e.g., a request from client computing device 120, which corresponds to a specified RESTful API. For example, plug-in 115, post method program 116, get method program 117, update method program 118 and delete method program 119 generate a RESTful API stub C++ source file that is then converted into RESTful API stub binary code. An application C++ source file is converted into application binary code, which is then compiled with the RESTful API stub binary code. The result is a web server plug-in that calls the generated RESTful API if a request comes in that corresponds to the specified RESTful API.

In exemplary embodiments, an application includes functions to be exposed as web services consisting of source and header files. Interface generator 145 is called by passing an application interface definition as a header file to plug-in 115, which generates all required stub source code to make the corresponding RESTful API available. The application source code and the generated RESTful API stub code are compiled using a C++ compiler, such as g++, and are linked together as a web server's plugin (binary code). The built plugin is deployed by configuring the web server to call the generated RESTful API if a request comes in that matches with the specified RESTful API.

For example, the web server receives an HTTP request from a client (e.g., from a browser, an application, or script). If the received request matches with the configured plugin, then the web server loads the generated plugin and calls the corresponding stub function. The generated stub function extracts input parameters in a language-independent data format, e.g., JSON or XML, from the HTTP request. The generated stub function validates and converts the extracted input parameters into a data format of an application and calls the associated method of the application. The returned result is converted into JSON format and added to the response message, which is sent by the web server to the client.

To enhance the application interface, the C++ header file, which contains the C++ class declarations, is converted, based on the class definitions within the C++ header file, into an IDL, which is fed into interface generator 145. The application interface is defined as the specification of input and output formats of C++ classes, which include meta-data required to auto-generate the code described above for server and client. The following are examples of the format of meta-data that is based on Doxygen tags syntax. In certain embodiments, these examples would be wrapped in a comment block or otherwise commented out within the code. Such examples are provided to facilitate understanding of the invention and are not to be interpreted as limiting.

Meta-Data Example 1: @App-Server <Uri Prefix>

The scope of meta-data example 1 is: file. This tag is used to specify a URI prefix for the application server, e.g., /my_server/my_app.

Meta-Data Example 2: @Uri <Class-Uri>

The scope of meta-data example 2 is: class. This tag is used to specify a URI prefix (e.g., the prefix "interface") for a class explicitly. The default entry for <class-uri> is: class name.

Meta-Data Example 3: @Attrs <List of Attributes for a Class>

The scope of meta-data example 3 is: class. This tag is to specify constraints or attributes of a class, which can be separated by commas or whitespace. A class constraint or attribute is one of the following values: a) create, read, update and delete (CRUD) (Sometimes called SCRUD with an "S" for search); or b) "singleton" indicates there is only one instance of this class. CRUD indicates the class supports full CRUD functionality as defined by REST, i.e., the class must provide the respective static methods create( ), read( ), update( ), and del( ). If not given, CRUD is the default. Any combination of those four letters can be used to indicate the CRUD support of a class, e.g. if only an "R" is listed, then that means that the class only supports GET methods (in which case the class is read-only).

Meta-Data Example 4: @Attrs <List of Attributes for a Class Property>

The scope of meta-data example 4 is: class property. This tag is used to specify constraints of a class property, separated by a comma or whitespace. A property constraint is one of the following values: a) "key=option" indicates a key property to be interpreted as an identification (ID) entry for an object, i.e., an object ID, in a REST request. Note that a class must have a key property. An option is either server-assigned or client-assigned. In the first case, server-assigned, the object key must not be given by the client for a create request, since the server generates a key value for the created object. The second case, client-assigned, requires the client to specify a key value for the object to be created; b) "read-only" indicates a read-only property, i.e., no update to the value of the property is allowed. The generated code shall respect this constraint for validation, e.g., before calling any update function, as modification of such read-only property is not allowed; and c) "length" indicates the maximal length (including the ending null terminator of a null-terminated string) of a string property.

Meta-Data Example 5: @Uri [<Method-Uri>]

The scope of meta-data example 5 is: class method. This tag is used to indicate a class method should be accessible via a REST call. If no method URI is given, the method name is used as default. It should be noted that in certain meta-data examples, such as meta-data examples 5 and 6, brackets are included to denote that the argument is optional. While those arguments are thus denoted as optional, it can also be seen in other examples, such as metadata example 3, that such an indication is not always required. As such, the use of such brackets may vary in accordance with an embodiment of the present invention. Continuing with the discussion of meta-data example 5, in order to call an object method, the following URI format must be used:
/my_server/my_app/class -uri/<key>/method-uri Meta-Data Example 6: @Param [in,Out,Size=<Number>]

The scope of meta-data example 6 is: class methods parameter. This tag is used to specify if a class method's parameter is input and/or output. For a parameter that is of the pointer type, the size attribute specifies the number of elements in the object that the pointer references.

The following is an example with 3 C++ classes. "Address" class defines a data type that represents an address, including a street, city, state and zip code. "Employee" class defines a data type that represents an employee, including a name, age, and address of the employee. "EmployeeManager" class defines a data type that represents a manager, and includes functions to add and remove employees.

Class: Address

@ object tag is used to declare Address class as an object to be used in RESTful APIs. To support the presentation of the Address class using "json" format, an argument of @ object tag is defined as "binding=json". Such an argument can also be extended as "binding=json,xml", which means that both json and xml are supported. An example of this can be seen in table 1.

TABLE 1

```
#ifndef ADDRESS_H
#define ___ADDRESS_H__
#include "cmr_types.h"
/**
 * @object[binding=json] */
class Address
{
public:
    string_t    street;
    string_t    city;
    string_t    state;
    string_t    zip;
};
#endif/*_ADDRESS_H_*/
```

Class: Employee

This class has @ object tag similar to "Address" class. In addition, it has @ref tag to define the following property is actually a reference to another C++ class, which, in this case, is the "Address" class, for property "home" and "office". An example of this can be seen in table 2.

TABLE 2

```
#ifndef _EMPLOYEE_H
#define _ EMPLOYEE_H
#include "cmr_types.h"
#include "Address.h"
/**
 * @object[binding=json]
 */
class Employee
{
public:
    string_t    name;
    int         age;
    /**
     * @ref* /
    Address     home;
    /**
     * @ref* /
    Address     *office;
    Employee( );
    ~Employee( );
};
#endif /*_EMPLOYEE_H_*/
```

Class: EmployeeManager

"Address" class and "Employee" class are data classes while this "EmployeeManager" class defines the actual RESTful interfaces, i.e., it indicates the class that will be converted to create the RESTful interface. In general, a RESTful interface matches the incoming HTTP request, facilitates the execution of some actions to fulfill the request and wraps a result of those executed actions up in an HTTP response. The RESTful interface generated based on the "EmployeeManager" class requires an HTTP request to include: a) the request URI; b) the content of the request; c) the action; d) the response code; and e) the content of the response.

Referring now to the example included in Table 3, it can be seen that, c) the action, is a class level method. In this example, a class level method dictates that Doxygen definitions for RESTful interfaces can only be applied to methods in the C++ class. As such, in this example, createEmployee( ), deleteEmployee( ), findEmployees( ), findEmployee( ) are all methods allowing Doxygen tagging.

TABLE 3

```
#ifndef _EMPLOYEE_MANAGER_H_
#define _EMPLOYEE_MANAGER_H_
#include <vector>
#include "Employee.h"
/**
 * @singleton
 */
class EmployeeManager
{
public:
    static EmployeeManager *getInstance( );
    static int freeResources(void **resource);
    /**
     * @brief       Create employee.
     *
     * @rest[uri="/employee", op=create]
     * @request[object=Employee, binding=json]
     * @param[in=body] emp
     */
    int createEmployee(Employee *emp);
    /**
     * @rest[uri="/employee/{name}", op=delete]
     * @param[in=key] name
     */
    int deleteEmployee(string_t *name);
    /**
     * @brief       Searches and returns all employees.
     *
     * @rest[uri="/employee", op=read]
     * @response[object=Employee, binding=json]
     * @param[out] emplist
     */
    int findEmployees(std::vector<Employee *> *emplist);
    /**
     * @brief       Searches and returns the employee.
     *
     * @rest[uri="/employee/{name}", op=read]
     * @response[object=Employee, binding=json]
     * @param[in=key] name
     * @param[out] emp
     */
    int findEmployee(string_t name, std::vector<Employee *> *emp);
};
#endif /* _EMPLOYEE_MANAGER_H_ */
```

@rest tag defines the request URI and its operation. The operation of a request determines which response code will be used according to the HTTP protocol. In this example, the createEmployee( ) method is tagged with "@rest[uri="/employee", op=create]". The request URI for the RESTful interface is "/employee" and the request performs a "create"_operation. Response code 201 is used to indicate CREATED as per HTTP protocol in which, a) the request URI, and, d) the response code, are provided.

@request tag defines the content of the request. In this example, createEmployee( ) method is tagged with "@request[object=Employee, binding=json]". The argument of @request tag embedded between square brackets ("[" and "]") specifies that the content of the request is an Employee object in JSON format, thus, providing b) the content of the request.

@response tag defines the content of the response. For operations like create, update, and delete, the response content could be empty, in which case the @response tag is optional. However, for an operation like read, the response content would be a data object. In this example, the findEmployee( ) method is tagged with "@response [object=Employee, binding=json]". The tag suggests that the response content is an Employee object in JSON format, thus providing e) the content of the response.

There are some other doxygen tags as well in the example, such as @singleton or @param. The @singleton tag specifies that the "EmployeeManager" class can have one and only one instance. The @param tag defines the parameter of the function following the tag is taken from the request URI, but the parameter name has to match the placeholder name in the URI embedded between curly brackets ("{" and "}").

In general, interface generator 145 reads C++ header files with annotations of meta-data, as described above, and generates server code to process an HTTP request as described in the following respective discussions of FIGS. 2, 3, 4, 5 and 6.

Figure 2:
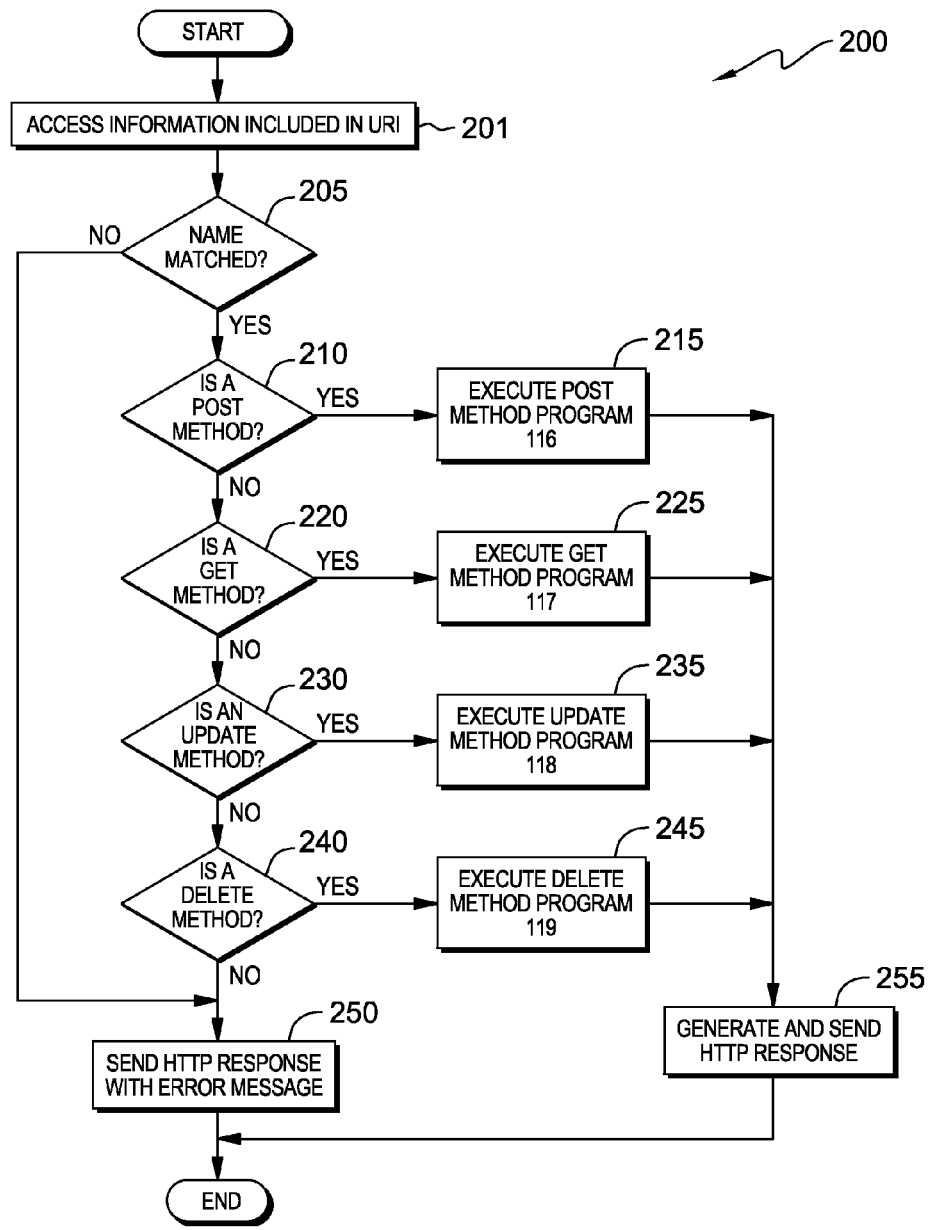
FIG. 2 is a flowchart illustrating the operational processes of a plug-in, executing on a server computing device within the environment of FIG. 1, in accordance with an exemplary embodiment of the present invention.

FIG. 2 is a flowchart, 200, illustrating the operational processes of plug-in 115, executing on server computing device 110 within the environment of FIG. 1, in accordance with an exemplary embodiment of the present invention.

In process 201, plug-in 115 accesses the information included in the URI of an HTTP request, identifies a resource name (or lack thereof), and compares that name with class names included in application functions 113. In general, if the requested resource name is matched, then plug-in 115 calls the appropriate post method program 116, get method program 117, update method program 118, and delete method program 119 according to the received HTTP request method. Otherwise, plug-in 115 sends an error response to the client as explained in the discussion of process 250.

In decision process 205, plug-in 115 determines whether the name included in the URI has been matched to a name included in application functions 113. If no name was identified in the URI, then plug-in 115 determines that there was not a match. If the name included in the URI has not been matched to a name included in application functions 113 (decision process 205, no branch), then plug-in 115 proceeds to process 250. If the name included in the URI has been matched to a name included in application functions 113 (decision process 205, yes branch), then plug-in 115 proceeds to decision process 210.

In decision process 210, plug-in 115 determines whether the HTTP request is a post method. If the HTTP request is a post method (decision process 210, yes branch), then plug-in 115 executes post method program 116, in process 215. Plug-in 115 proceeds to process 255. If the HTTP request is not a post method (decision process 210, no branch), then plug-in 115 proceeds to decision process 220.

In decision process 220, plug-in 115 determines whether the HTTP request is a get method. If the HTTP request is a get method (decision process 220, yes branch), then plug-in 115 executes get method program 117, in process 225. Plug-in 115 proceeds to process 255. If the HTTP request is not a get method (decision process 220, no branch), then plug-in 115 proceeds to decision process 230.

In decision process 230, plug-in 115 determines whether the HTTP request is an update method. If the HTTP request is an update method (decision process 230, yes branch), then plug-in 115 executes update method program 118, in process 235. Plug-in 115 proceeds to process 255. If the HTTP request is not an update method (decision process 230, no branch), then plug-in 115 proceeds to decision process 240.

In decision process 240, plug-in 115 determines whether the HTTP request is a delete method. If the HTTP request is a delete method (decision process 240, yes branch), then plug-in 115 executes delete method program 119, in process 245. Plug-in 115 proceeds to process 255. If the HTTP request is not a delete method (decision process 240, no branch), then plug-in 115 determines that the class name does not match with any class included in the C++ header data and proceeds to process 250.

In process 250, plug-in 115 sends an HTTP response with an error message to the client, i.e., the sender of the HTTP request, via web server 111. In process 255, plug-in 115 uses the output RESTful API stub code, from post method program 116, get method program 117, update method program 118, or delete method program 119, to generate and send an HTTP response to web server 111 for delivery to client computing device 120.

Figure 3:
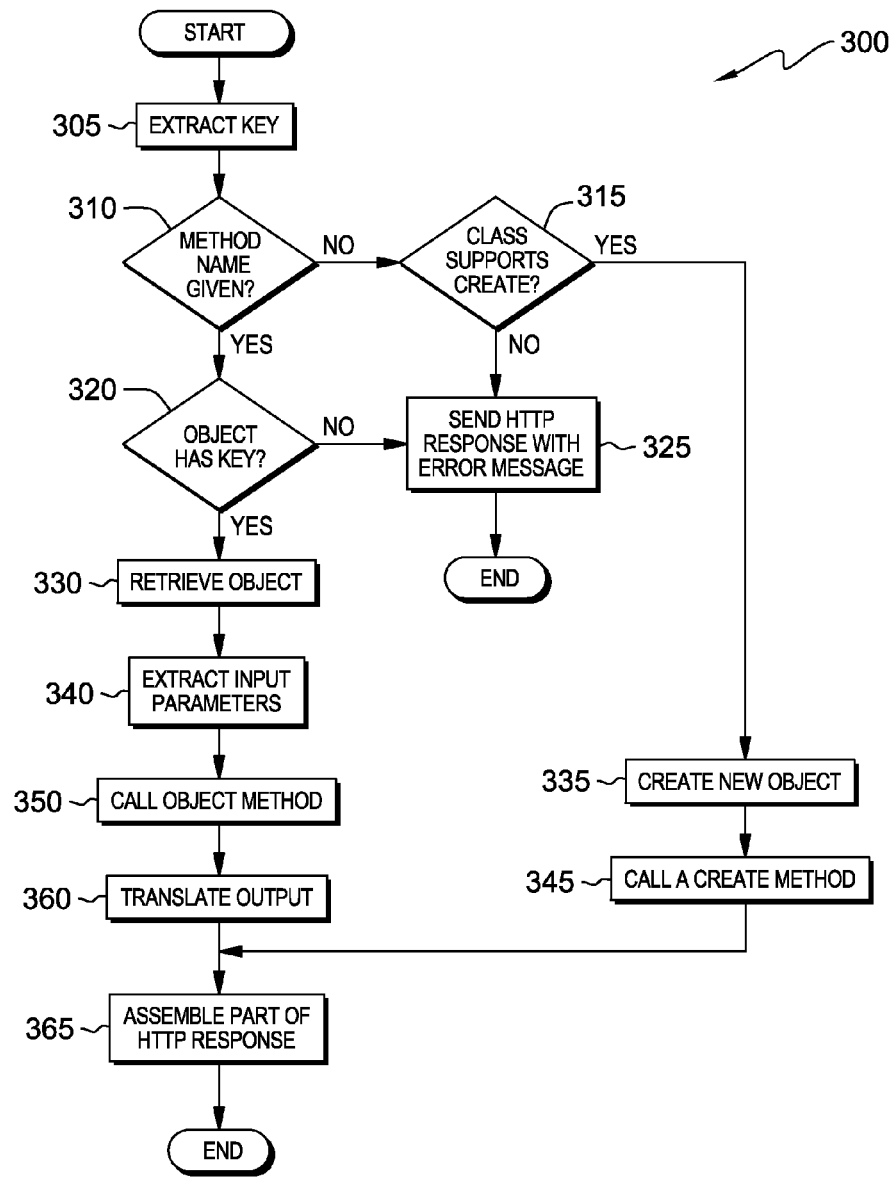
FIG. 3 is a flowchart illustrating operational processes of a post method program, executing on a computing device within the environment of FIG. 1, in accordance with an exemplary embodiment of the present invention.

FIG. 3 is a flowchart, 300, illustrating operational processes of post method program 116, executing on server computing device 110 within the environment of FIG. 1, in accordance with an exemplary embodiment of the present invention.

In process 305, post method program 116 extracts an object key from the URI included in application functions 113. In the case that there is no object key in the URI, an error message is generated as explained in the description of process 325. In decision process 310, post method program 116 determines whether a method name is given after the object key. If a method name is not given after the object key (decision process 310, no branch), then post method program 116 proceeds to decision process 315. If a method name is given after the object key (decision process 310, yes branch), then post method program 116 proceeds to decision process 320.

In decision process 315, post method program 116 determines whether the class of the post method supports a create function. If the class does not support a create function (decision process 315, no branch), then post method program 116 sends an HTTP response with an error message to the sender of the HTTP request, via web server 111, in process 325. If the class does support a create function (decision process 315, yes branch), then post method program 116 proceeds to decision process 335.

In process 335, post method program 116 creates a new object with the given key and properties. In process 345, post method program 116 calls a create method that has the new object as a parameter; and proceeds to process 365.

In decision process 320, post method program 116 determines whether the object has a key. If the object does not have a key (decision process 320, no branch), then post method program 116 proceeds to process 325. If the object has a key (decision process 320, yes branch), then post method program 116 proceeds to process 330.

In process 330, post method program 116 retrieves an object that has the key. In process 340, post method program 116 extracts input parameters in a data-interchange format (e.g., data in a language-independent data format such as JSON), from the body of the HTTP request. In process 350, post method program 116 calls an object method that uses the extracted input parameters. In process 360, post method program 116 translates the output parameters of the called object method into a data-interchange format, which, in this example, is JSON.

In process 365, post method program 116 assembles part of an HTTP response, in the form of RESTful API stub code, and sends it to plug-in 115 based on either a result of the called create method (from process 345) or the translated output parameters of the called object method (from process 360).

Figure 4:
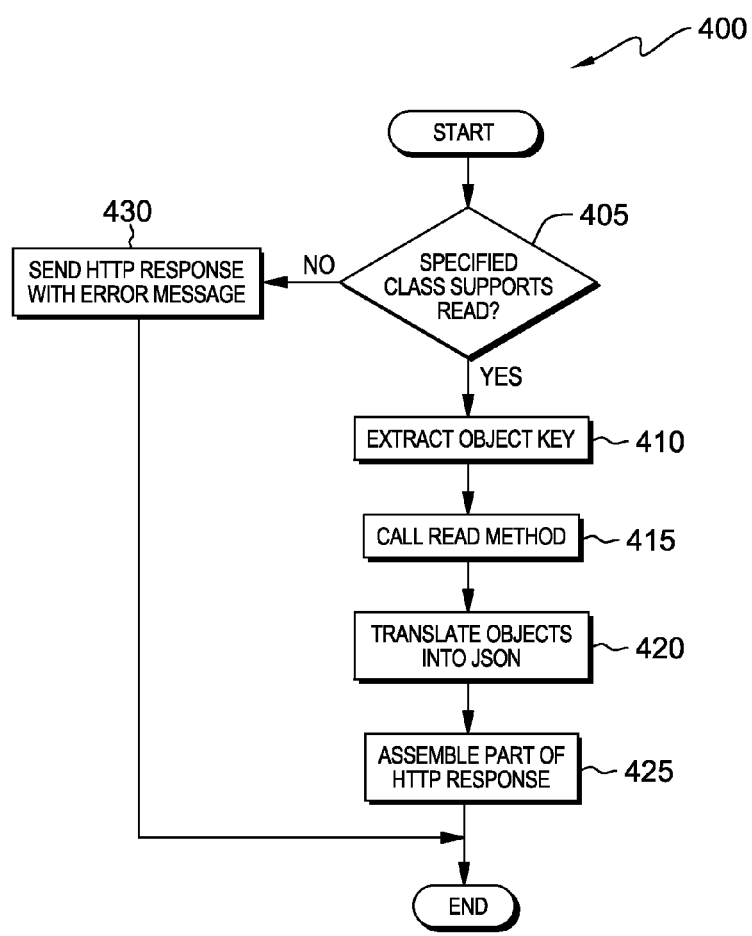
FIG. 4 is a flowchart illustrating operational processes of a get method program, executing on a computing device within the environment of FIG. 1, in accordance with an exemplary embodiment of the present invention.

FIG. 4 is a flowchart, 400, illustrating operational processes of get method program 117, executing on server computing device 110 within the environment of FIG. 1, in accordance with an exemplary embodiment of the present invention.

In decision process 405, get method program 117 determines whether the class of the get method supports a read function. If the class does not support a read function (decision process 405, no branch), then get method program 117 sends an HTTP response with an error message to the sender of the HTTP request, via web server 111, in process 430. If the class does support a read function (decision process 405, yes branch), then get method program 117 proceeds to process 410.

In process 410, get method program 117 extracts an object key from the URI included in application functions 113. In process 415, get method program 117 calls a read method that uses the object key to obtain the requested object. It should be noted that if the object key is empty, then the read returns a list of all objects. In process 420, get method program 117 translates the returned object into a data-interchange format, such as JSON. In process 425, get method program 117 assembles part of an HTTP response, in the form of RESTful API stub code, and sends it to plug-in 115 based on the translated object.

Figure 5:
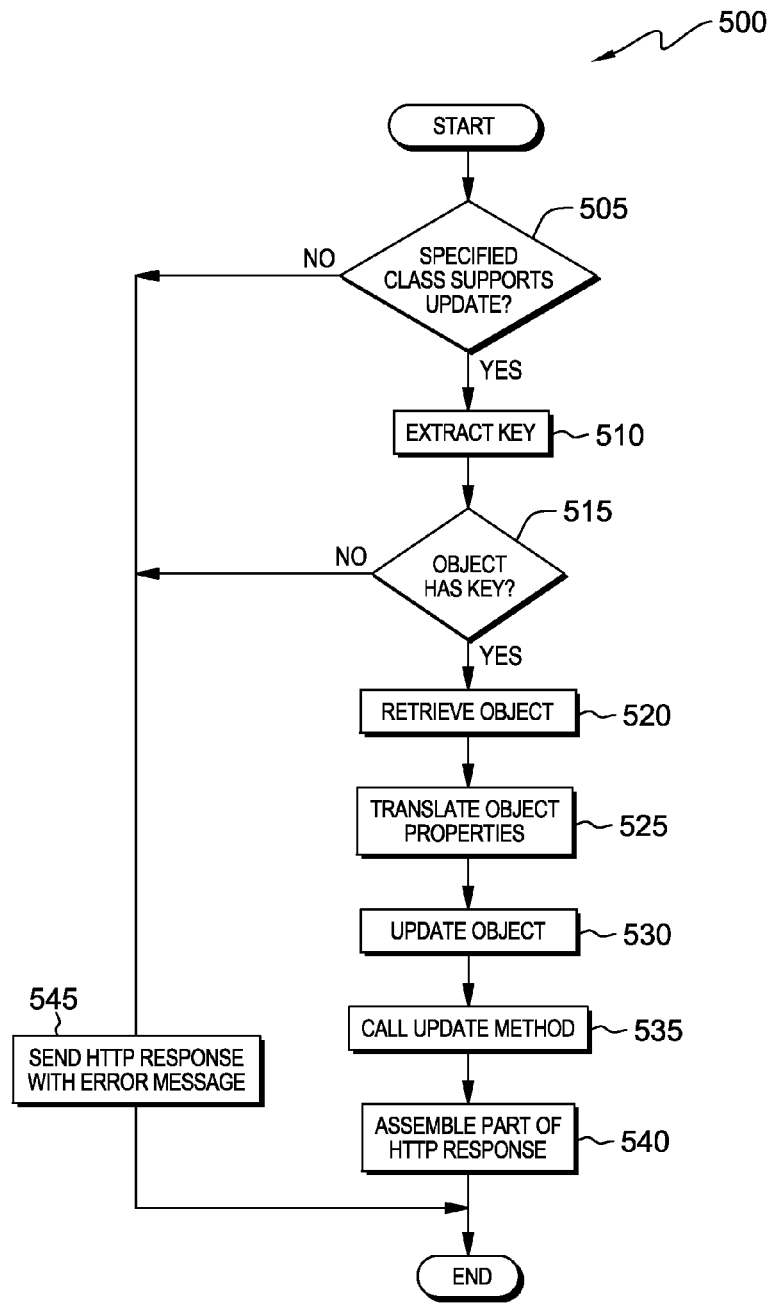
FIG. 5 is a flowchart illustrating operational processes of an update method program, executing on a computing device within the environment of FIG. 1, in accordance with an exemplary embodiment of the present invention.

FIG. 5 is a flowchart, 500, illustrating operational processes of update method program 118, executing on computing device 118 within the environment of FIG. 1, in accordance with an exemplary embodiment of the present invention.

In decision process 505, update method program 118 determines whether the class of the update method supports an update function. If the class does not support an update function (decision process 505, no branch), then update method program 118 sends an HTTP response with an error message to the sender of the HTTP request, via web server 111, in process 545. If the class does support an update function (decision process 505, yes branch), then update method program 118 proceeds to process 510.

In process 510, update method program 118 extracts an object key from the URI included in application functions 113. In decision process 515, update method program 118 determines whether an object exists that has the key. If an object does not exist that has the key (decision process 515, no branch), then update method program 118 sends an HTTP response with an error message to the sender of the HTTP request, in process 545. If an object does exist that has the key (decision process 515, yes branch), then update method program 118 retrieves that object, in process 520.

In process 525, update method program 118 translates the object properties, included in the body of the HTTP request, into a data-interchange format, e.g., JSON. In process 530, update method program 118 updates the object with the translated properties. In process 535, update method program 118 calls an update method that uses the updated object as a parameter. In process 540, update method program 118 assembles part of an HTTP response, in the form of RESTful API stub code, and sends it to plug-in 115 based on the results of the called update method that used the updated object as a parameter.

Figure 6:
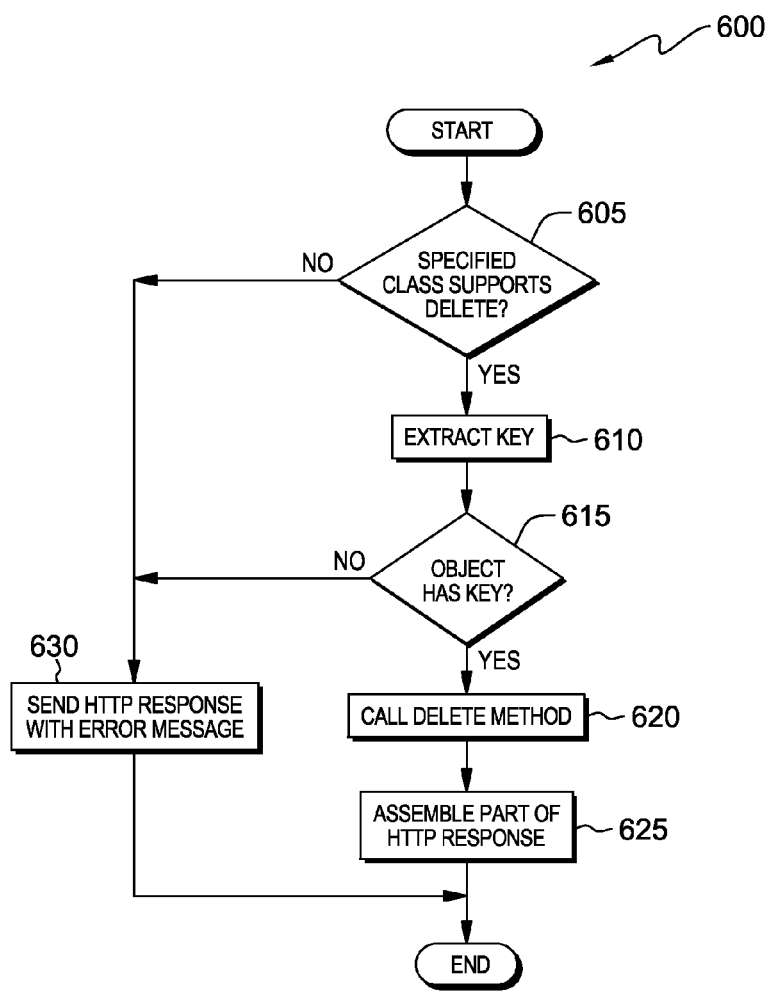
FIG. 6 is a flowchart illustrating operational processes of a delete method program, executing on a computing device within the environment of FIG. 1, in accordance with an exemplary embodiment of the present invention.

FIG. 6 is a flowchart, 600, illustrating operational processes of delete method program 119, executing on server computing device 110 within the environment of FIG. 1, in accordance with an exemplary embodiment of the present invention.

In decision process 605, delete method program 119 determines whether the class of the delete method supports a delete function. If the class does not support a delete function (decision process 605, no branch), then delete method program 119 sends an HTTP response with an error message to the sender of the HTTP request, via web server 111, in process 630. If the class does support a delete function (decision process 605, yes branch), then delete method program 119 proceeds to process 610.

In process 610, delete method program 119 extracts an object key from the URI included in application functions 113. In decision process 615, delete method program 119 determines whether an object exists that has the key. If an object does not exist that has the key (decision process 615, no branch), then delete method program 119 sends an HTTP response with an error message to the sender of the HTTP request, in process 630. If an object does exist that has the key (decision process 615, yes branch), then delete method program 119 calls a delete method that uses the key as a parameter, in process 620. In process 625, delete method program 119 assembles part of an HTTP response, in the form of RESTful API stub code, and sends it to plug-in 115 based on the results of the called delete method that used the used the key as a parameter.

Figure 7:
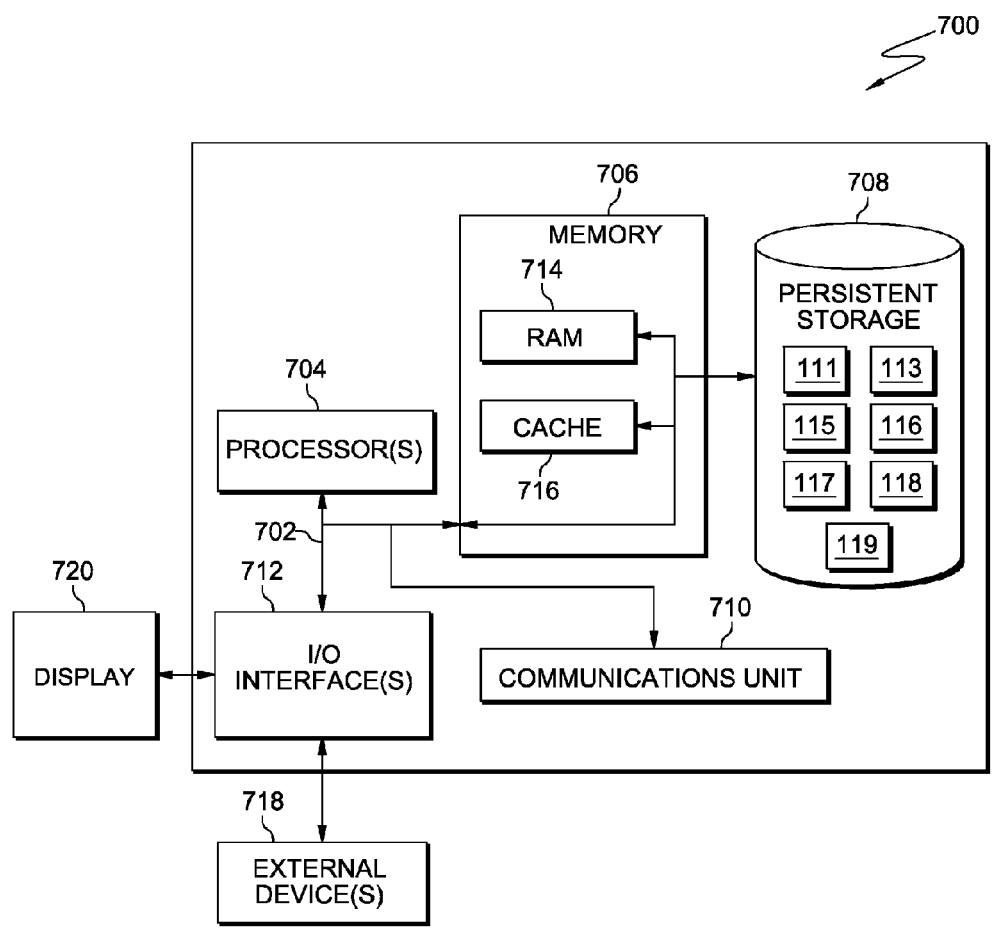
FIG. 7 depicts a block diagram of components of a server computing device, a client computing device and a development computing device each respectively executing some or all of a plug-in, an interface generator, an applications functions, a web server, a post method program, a get method program, an update method program, and a delete method program, in accordance with an exemplary embodiment of the present invention.

FIG. 7 depicts a block diagram, 700, of components of a server computing device 110, a client computing device 120 and a development computing device 140 each respectively executing some or all of plug-in 115, interface generator 145, applications functions 113, web server 111, post method program 116, get method program 117, update method program 118, and delete method program 119, in accordance with an exemplary embodiment of the present invention. It should be appreciated that FIG. 7 provides only an illustration of one implementation and does not imply any limitations with regard to the environments in which different embodiments may be implemented. Many modifications to the depicted environment may be made.

Server computing device 110, client computing device 120 and development computing device 140 respectively include communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Plug-in 115, post method program 116, get method program 117, update method program 118, delete method program 119, application functions 113, and web server 111 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 130. In these examples, communications unit 710 includes one or more network interface cards. Communications unit 710 may provide communications through the use of either or both physical and wireless communications links. Plug-in 115, post method program 116, get method program 117, update method program 118, delete method program 119, interface generator 145, application functions 113 and web server 111 may be downloaded to persistent storage 708 through communications unit 710.

I/O interface(s) 712 allows for input and output of data with other devices that may be respectively connected to server computing device 110 and client computing device 120. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., plug-in 115, post method program 116, get method program 117, update method program 118, delete method program 119, application functions 113 and web server 111, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

FIG. 8 depicts a flow diagram, 800, illustrating a general workflow of interface generator 145 executing on development computing device 140 as shown in FIG. 1, in accordance with an exemplary embodiment of the present invention.

Application C++ header file, 805, are functions written by an application developer that are to be exposed as web services. They consist of source and header files.

RESTful API code generator, 810, generates the required stub source code, using an application interface as a header file.

RESTful API stub C++ source file is the generated stub source code, 815, which allows the corresponding RESTful API to be made available.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   extracting, by one or more processors, a class name from a uniform resource identifier (URI) of an application header of a standardized interface request that includes a command formatted in an application protocol, wherein the application header includes meta-data that allows class declarations to function, at least in part, as a portion of interface description language, the meta-data including one or more doxygen tags as annotations in C++ inline comments;
   processing, by the one or more processors, the command based, at least in part, on a type of the command, the application protocol of the command, and the meta-data, the processing of the command comprising extracting, by the one or more processors, an object key from the URI; and
   sending, by the one or more processors, a standardized interface response based on a result of the processing.

2. The method as recited in claim 1, further comprising:
   identifying, by the one or more processors, the type of the command based, at least in part, on the application protocol of the command.

3. The method as recited in claim 2, further comprising:
   determining, by the one or more processors, whether the command supports one of a create function, a read function, an update function, or a delete function; and
   calling, by the one or more processors, a function supported by the command based, at least in part, on the identified type of the command.

4. The method as recited in claim 2, wherein the processing, by the one or more processors, the command based, at least in part, on the identified type of the command, the application protocol of the command, and the meta-data further comprises:
   responsive to a determination that the type of command is a command that requests acceptance of an entity enclosed in the standardized interface request as a new subordinate of a web resource identified by the URI, determining, by the one or more processors, whether a command name was given after the object key;
   responsive to a determination that the command name was not given after the object key:
      creating, by the one or more processors, a new object, for an identified command that supports a create function;
      generating, by the one or more processors, a new create command that includes the new object as a parameter; and
      calling, by the one or more processors, the new create command, wherein the standardized interface response is based on a result of the called new create command; and
   responsive to a determination that the command name was given after the object key:
      retrieving, by the one or more processors, an object that has the object key;
      extracting, by the one or more processors, input parameters in a data-interchange format from a body of the standardized interface request;
      calling, by the one or more processors, an object command that uses the extracted input parameters; and
      translating, by the one or more processors, output parameters of the called object command into a data-interchange format, wherein the standardized interface response is based, at least in part, on the translated output parameters of the called object command.

5. The method as recited in claim 2, wherein the processing, by the one or more processors, the command based, at least in part, on the identified type of the command, the application protocol of the command, and the meta-data further comprises:
responsive to a determination that the type of command is a command that requests acceptance of an entity enclosed in the standardized interface request as a new subordinate of a web resource identified by the URI, determining, by the one or more processors, whether a command name was given after the object key;
responsive to a determination that the command name was given after the object key:
retrieving, by the one or more processors, an object that has the object key;
extracting, by the one or more processors, input parameters in a data-interchange format from a body of the standardized interface request;
calling, by the one or more processors, an object command that uses the extracted input parameters; and
translating, by the one or more processors, output parameters of the called object command into a data-interchange format, wherein the standardized interface response is based, at least in part, on the translated output parameters of the called object command.

6. The method as recited in claim 2, further comprising:
responsive to a determination that the type of command is a request for a representation of a specified resource, calling, by the one or more processors, a read command that uses the object key to obtain a requested object; and
translating, by the one or more processors, a returned object into a data-interchange format, wherein the standardized interface response is based, at least in part, on the translated object.

7. The method as recited in claim 2, further comprising:
responsive to a determination that the type of command is a request to update a resource specified by the standardized interface request, retrieving, by the one or more processors, an object that has the object key;
translating, by the one or more processors, object properties, included in a body of the standardized interface request, into a data-interchange format;
updating, by the one or more processors, the object that has the key with the translated properties; and
calling, by the one or more processors, an update command that uses the updated object as a parameter, wherein the standardized interface response is based, at least in part, on a result of the called update command that uses the updated object as a parameter.

8. The method as recited in claim 2, further comprising:
responsive to a determination that the type of command is a request to delete a resource specified by the standardized interface request, calling, by the one or more processors, a delete command that uses the key as a parameter, wherein the standardized interface response is based, at least in part, on a result of the called delete command that used the used the key as a parameter.

9. A computer program product, the computer program product comprising a computer-readable storage medium and program instructions stored on the computer-readable storage medium, the program instructions readable/executable by one or more processors to perform a method, the method comprising:
extracting, by the one or more processors, a class name from a uniform resource identifier (URI) of an application header of a standardized interface request that includes a command formatted in an application protocol, wherein the application header includes meta-data that allows class declarations to function, at least in part, as a portion of interface description language;
processing, by the one or more processors, the command based, at least in part, on a type of the command, the application protocol of the command, and the meta-data, the processing of the command comprising extracting, by the one or more processors, an object key from the URI; and
sending, by the one or more processors, a standardized interface response based on a result of the processing.

10. The computer program product as recited in claim 9, wherein the method further comprises:
identifying, by the one or more processors, the type of the command based, at least in part, on the application protocol of the command,
wherein the meta-data includes one or more doxygen tags as annotations in C++ inline comments.

11. The computer program product as recited in claim 10, wherein the method further comprises:
determining, by the one or more processors, whether the command supports one of a create function, a read function, an update function, or a delete function; and
calling, by the one or more processors, a function supported by the command based, at least in part, on the identified type of the command.

12. The computer program product as recited in claim 10, wherein the processing, by the one or more processors, the command based, at least in part, on the identified type of the command, the application protocol of the command, and the meta-data further comprises:
responsive to a determination that the type of command is a command that requests acceptance of an entity enclosed in the standardized interface request as a new subordinate of a web resource identified by the URI, determining, by the one or more processors, whether a command name was given after the object key;
responsive to a determination that the command name was not given after the object key:
creating, by the one or more processors, a new object, for an identified command that supports a create function;
generating, by the one or more processors, a new create command that includes the new object as a parameter; and
calling, by the one or more processors, the new create command, wherein the standardized interface response is based on a result of the called new create command; and
responsive to a determination that the command name was given after the object key:
retrieving, by the one or more processors, an object that has the object key;
extracting, by the one or more processors, input parameters in a data-interchange format from a body of the standardized interface request;
calling, by the one or more processors, an object command that uses the extracted input parameters; and translating, by the one or more processors, output parameters of the called object command into a data-interchange format, wherein the standardized interface response is based, at least in part, on the translated output parameters of the called object command.

13. The computer program product as recited in claim 10, wherein the processing, by the one or more processors, the command based, at least in part, on the identified type of the command, the application protocol of the command, and the meta-data further comprises:
responsive to a determination that the type of command is a command that requests acceptance of an entity enclosed in the standardized interface request as a new subordinate of a web resource identified by the URI, determining, by the one or more processors, whether a command name was given after the object key;
responsive to a determination that the command name was given after the object key:
retrieving, by the one or more processors, an object that has the object key;
extracting, by the one or more processors, input parameters in a data-interchange format from a body of the standardized interface request;
calling, by the one or more processors, an object command that uses the extracted input parameters; and
translating, by the one or more processors, output parameters of the called object command into a data-interchange format, wherein the standardized interface response is based, at least in part, on the translated output parameters of the called object command.

14. The computer program product as recited in claim 10, wherein the method further comprises:
responsive to a determination that the type of command is a request for a representation of a specified resource, calling, by the one or more processors, a read command that uses the object key to obtain a requested object; and
translating, by the one or more processors, a returned object into a data-interchange format, wherein the standardized interface response is based, at least in part, on the translated object.

15. The computer program product as recited in claim 10, wherein the method further comprises:
responsive to a determination that the type of command is a request to update a resource specified by the standardized interface request, retrieving, by the one or more processors, an object that has the object key;
translating, by the one or more processors, object properties, included in a body of the standardized interface request, into a data-interchange format;
updating, by the one or more processors, the object that has the key with the translated properties; and
calling, by the one or more processors, an update command that uses the updated object as a parameter, wherein the standardized interface response is based, at least in part, on a result of the called update command that uses the updated object as a parameter.

16. The computer program product as recited in claim 10, wherein the method further comprises:
responsive to a determination that the type of command is a request to delete a resource specified by the standardized interface request, calling, by the one or more processors, a delete command that uses the key as a parameter, wherein the standardized interface response is based, at least in part, on a result of the called delete command that used the used the key as a parameter.

17. A computer system comprising:
a computer-readable memory; and
one or more processors in electrical communication with the memory, wherein the one or more processors are configured to perform a method, the method comprising:
extracting, by the one or more processors, a class name from a uniform resource identifier (URI) of an application header of a standardized interface request that includes a command formatted in an application protocol, wherein the application header includes meta-data that allows class declarations to function, at least in part, as a portion of interface description language;
processing, by the one or more processors, the command based, at least in part, on a type of the command, the application protocol of the command, and the meta-data, the processing of the command comprising extracting, by the one or more processors, an object key from the URI; and
sending, by the one or more processors, a standardized interface response based on a result of the processing.

18. The computer system as recited in claim 17, wherein the method further comprises:
determining, by the one or more processors, whether the command supports one of a create function, a read function, an update function, or a delete function; and
calling, by the one or more processors, a function supported by the command based, at least in part, on the identified type of the command,
wherein the meta-data includes one or more doxygen tags as annotations in C++ inline comments.

19. The computer system as recited in claim 17, wherein the processing, by the one or more processors, the command based, at least in part, on the identified type of the command, the application protocol of the command, and the meta-data further comprises:
responsive to a determination that the type of command is a command that requests acceptance of an entity enclosed in the standardized interface request as a new subordinate of a web resource identified by the URI, determining, by the one or more processors, whether a command name was given after the object key;
responsive to a determination that the command name is not given after the object key:
creating, by the one or more processors, a new object, for an identified command that supports a create function;
generating, by the one or more processors, a new create command that includes the new object as a parameter; and
calling, by the one or more processors, the new create command, wherein a standardized interface response is based on a result of the called new create command; and
responsive to a determination that the command name was given after the object key:
retrieving, by the one or more processors, an object that has the object key;
extracting, by the one or more processors, input parameters in a data-interchange format from a body of the standardized interface request;

calling, by the one or more processors, an object command that uses the extracted input parameters; and translating, by the one or more processors, output parameters of the called object command into a data-interchange format, wherein the standardized interface response is based, at least in part, on the translated output parameters of the called object command.

20. The computer system as recited in claim 17, wherein the processing, by the one or more processors, the command based, at least in part, on the identified type of the command, the application protocol of the command, and the meta-data further comprises:

responsive to a determination that the type of command is a command that requests acceptance of an entity enclosed in the standardized interface request as a new subordinate of a web resource identified by the URI, determining, by the one or more processors, whether a command name was given after the object key;

responsive to a determination that the command name is given after the object key:

retrieving, by the one or more processors, an object that has the object key;

extracting, by the one or more processors, input parameters in a data-interchange format from a body of the standardized interface request;

calling, by the one or more processors, an object command that uses the extracted input parameters; and translating, by the one or more processors, output parameters of the called object command into a data-interchange format, wherein a standardized interface response is based, at least in part, on the translated output parameters of the called object command.

\* \* \* \* \*